United States Patent
Miki (10) Patent No.: US 8,393,220 B2
(45) Date of Patent: Mar. 12, 2013

(54) OPTICAL FIBER TYPE VIBRATION METER

(75) Inventor: Yutaka Miki, Tokyo (JP)

(73) Assignee: Mitutoyo Corporation, Kanagawa (JP)

( * ) Notice: Subject to any disclaimer, the term of this patent is extended or adjusted under 35 U.S.C. 154(b) by 280 days.

(21) Appl. No.: 12/984,986

(22) Filed: Jan. 5, 2011

(65) Prior Publication Data

US 2011/0167916 A1 Jul. 14, 2011

(30) Foreign Application Priority Data

Jan. 8, 2010 (JP) ................................. 2010-003237

(51) Int. Cl.
*G01H 9/00* (2006.01)
(52) U.S. Cl. ........................................... 73/655; 73/649
(58) Field of Classification Search .................... 73/655, 73/649; 385/12, 13
See application file for complete search history.

(56) References Cited

U.S. PATENT DOCUMENTS

| | | | | |
|---|---|---|---|---|
| 5,264,909 A | * | 11/1993 | Rochester | 356/73.1 |
| 5,293,040 A | * | 3/1994 | Watanabe et al. | 250/231.1 |
| 5,918,287 A | * | 6/1999 | Luukkala et al. | 73/862.391 |
| 6,314,214 B1 | * | 11/2001 | Walter et al. | 385/13 |
| 7,426,038 B2 | * | 9/2008 | Ogawa | 356/484 |
| 2002/0000804 A1 | | 1/2002 | Moriya et al. | |
| 2003/0133657 A1 | | 7/2003 | Kochergin et al. | |
| 2008/0041162 A1 | | 2/2008 | Twerdochlib | |
| 2008/0225376 A1 | | 9/2008 | Kim | |

OTHER PUBLICATIONS

Mitutoyo, "Vibration Pickup", Catalog No. 4351.

* cited by examiner

*Primary Examiner* — J M Saint Surin
(74) *Attorney, Agent, or Firm* — Greenblum & Bernstein, P.L.C.

(57) ABSTRACT

An optical fiber type vibration meter including a light source, an incident side optical fiber guiding light from the light source, a vibration probe to which a guided light is made incident, an optical receiver photoelectric-converting light modulated by a vibration of a weight and a movable coil arranged in the vibration probe to output the light as an electrical signal, a processor processing the electrical signal to output a state of the vibration as an output voltage value, a velocity pickup converting a velocity of the weight and the movable coil arising from the vibration of the weight and the movable coil into an electrical current, a solenoidal coil generating a magnetic field by the electrical current, and a magnetic field sensor attenuating an amount of light guided to the vibration probe according to an intensity of the magnetic field.

20 Claims, 9 Drawing Sheets

OPTICAL FIBER TYPE VIBRATION METER

CROSS-REFERENCE TO RELATED APPLICATIONS

The present application claims priority under 35 U.S.C. §119 of Japanese Application No. 2010-003237, filed on Jan. 8, 2010, the disclosure of which is expressly incorporated by reference herein in its entirety.

BACKGROUND OF THE INVENTION

1. Field of the Invention

The present invention relates to an optical fiber type vibration meter having a light source; an optical fiber guiding light from the light source, a vibration probe to which the guided light is made incident; an optical receiver photoelectric-converting light modulated by vibration of a movable member arranged in the vibration probe to output the light as an electrical signal; and a processor processing the electrical signal to output a state of the vibration as an output voltage value. In particular, the present invention relates to an optical fiber type vibration meter capable of high precision measurement.

2. Description of Related Art

Conventionally, there are various types of vibration meters. For example, the vibration meters can be divided into a group of an optical fiber type and a group of a non-optical fiber type. In a vibration meter of a non-optical fiber type, as disclosed in Publication 1, output from a vibration probe is an electrical signal. Therefore, when a cable from the vibration probe is long, it is susceptible to electromagnetic induction noises. At the same time, transmission loss via a cable cannot be ignored, and it is possible that signal quality may deteriorate.

On the other hand, a vibration meter of an optical fiber type outputs light from a vibration probe using an optical fiber as a transmission path (for example, Related Art 1). Therefore, a vibration meter of an optical fiber type has an advantage in that, even when the optical fiber cable is long, there is nearly no deterioration in signal quality, and high explosion proof can be maintained without being affected by electromagnetic induction noises.

[Related Art 1] Japanese Patent No. HEI 3-22595 B2.
[Publication 1] Mitutoyo, Vibration Pickup, Catalog No. 4351.

However, the optical fiber type vibration meter disclosed in Related Art 1 obtains an acceleration output by assuming that a displacement of a weight (a movable member) in a seismic system is proportional to vibration acceleration. Therefore, in Related Art 1, the acceleration output is affected by static gravity, and an offset error occurs.

As solutions to this problem, passing an acceleration output through a high-pass filter, removing an average value of data, electrically zero-setting an acceleration output, and the like, have been considered. However, for the former two, when it is an asymmetric vibration or when an average data length is not an integral multiple of a vibration wavelength, an error remains. For the latter, there is a problem that it is not applicable in a situation where a state of zero vibration cannot be ensured. Further, in order to perform these processes, there is a possibility that a processor processing a signal from a vibration probe becomes complex.

SUMMARY OF THE INVENTION

The present invention is devised to solve the above-described problem. An advantage of the present invention is to provide an optical fiber type vibration meter capable of high precision measurement without the need of a complex configuration, while relying on the advantage of using an optical fiber.

One aspect of the present invention is an optical fiber type vibration meter having a light source; an optical fiber guiding light from the light source; a vibration probe to which the guided light is made incident; an optical receiver photoelectric-converting light modulated by a vibration of a movable member arranged in the vibration probe to output the light as an electrical signal; a processor processing the electrical signal to output a state of the vibration as an output voltage value; a velocity pickup converting a velocity of the movable member arising from the vibration of the movable member into an electrical current; a solenoidal coil generating a magnetic field by the electrical current; and a magnetic field sensor attenuating an amount of light guided to the vibration probe according to an intensity of the magnetic field.

According to another aspect of the present invention, the magnetic field sensor changes an amount of light guided to the vibration probe also according to a direction of a magnetic field generated by the solenoidal coil.

According to another aspect of the present invention, the magnetic field sensor has a polarizer linearly polarizing light guided to the vibration probe; and a Faraday rotator rotating polarization of light passing through the polarizer by the intensity of the magnetic field.

According to another aspect of the present invention, the velocity pickup has a coil being connected to the solenoidal coil; and a permanent magnet providing a magnetic field to the coil, and the coil relatively vibrates with respect to the permanent magnet.

According to another aspect of the present invention, the velocity pickup is covered with a shield case for shielding an effect of a magnetic field external to the velocity pickup.

According to another aspect of the present invention, in the vibration probe, a vibration axis of the movable member, a direction axis of a magnetic field generated by the solenoidal coil and a magnetic field measurement axis of the magnetic field sensor are identical or parallel, and the velocity pickup, the solenoidal coil and the magnetic field sensor are integrally configured.

According to another aspect of the present invention, the light source guides light of a plurality of wavelengths to the optical fiber, and, at the vibration probe, light outgoing from the optical fiber is dispersed into each of the wavelengths, and is modulated by the vibration detected by a same number of the velocity pickups as the wavelengths.

According to another aspect of the present invention, the processor has a squarer squaring the electrical signal.

According to another aspect of the present invention, the processor has a differentiator, and outputs as the output voltage value an acceleration representing a state of the vibration.

According to the present invention, while relying on the advantage of using an optical fiber, high precision measurement is possible without the need of a complex configuration. That is, it is possible for a long distance signal transmission maintaining signal quality as output from a vibration probe, without the need of power feeding during the transmission. At the same time, heat generation is also reduced, and it can be made slim and light-weighted. Further, high explosion proof can be maintained. At the same time, an offset error due to static gravity can be prevented.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, with reference to the drawings, an example of an embodiment of the present invention is explained in detail.

Figure 1:
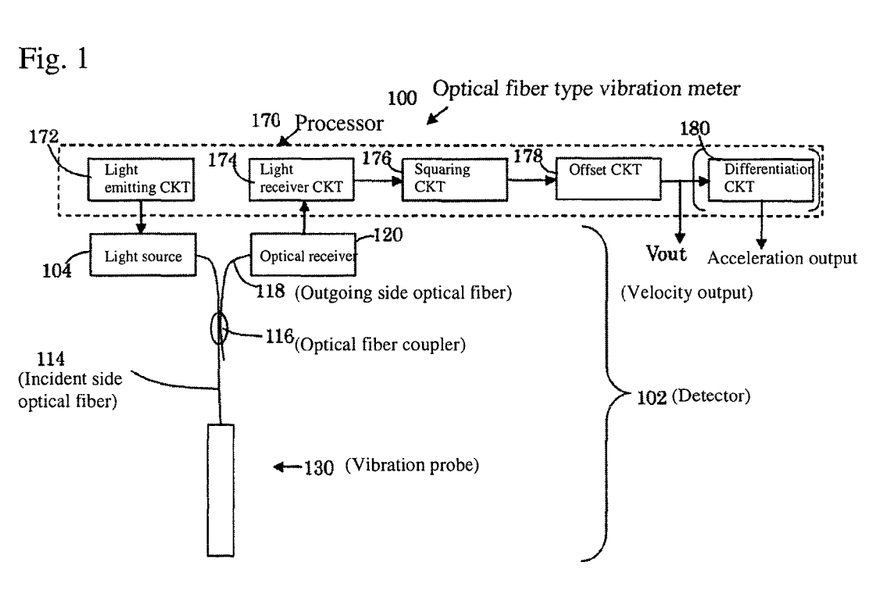
FIG. 1 is an overall pattern diagram of an optical fiber type vibration meter according to a first embodiment of the present invention.
Figure 2:
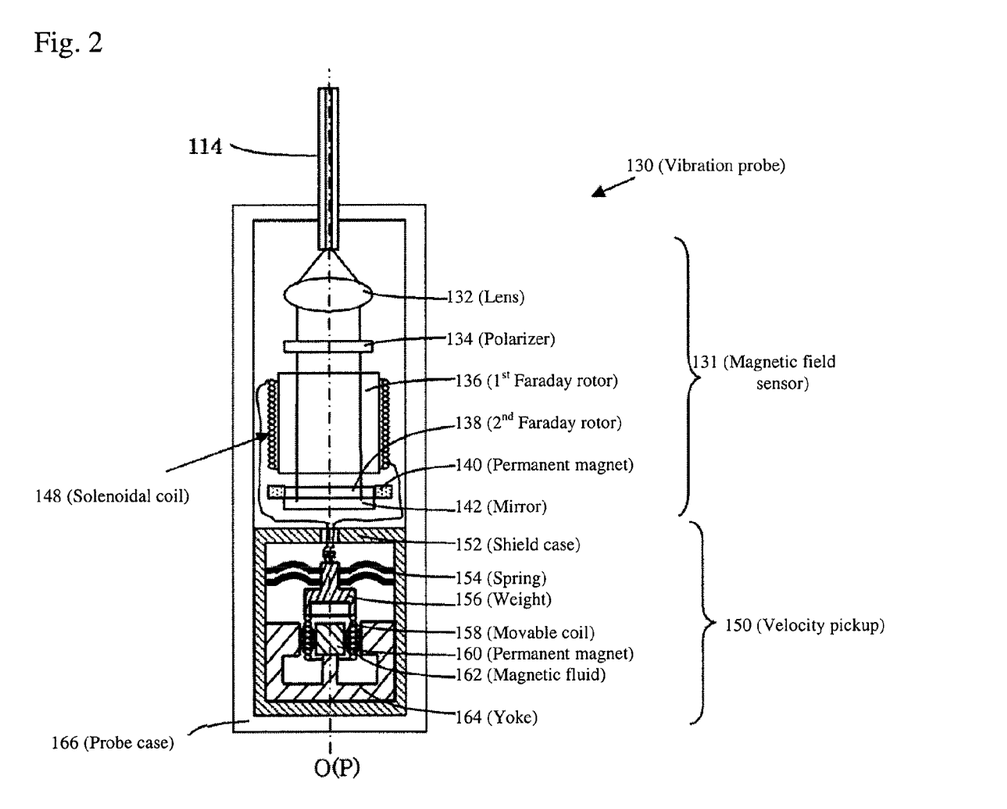
FIG. 2 is an enlarged pattern diagram of a vibration probe of the optical fiber type vibration meter according to the first embodiment of the present invention.

First, an overview of an optical fiber type vibration meter according to a first embodiment is explained using FIG. 1 and FIG. 2.

As illustrated in FIG. 1 and FIG. 2, an optical fiber type vibration meter 100 has a light source 104; an incident side optical fiber 114 (optical fiber) guiding light from the light source 104; a vibration probe 130 to which the guided light is made incident; an optical receiver 120 photoelectric-converting light modulated by vibration of a weight 156 and a movable coil 158 (movable member) arranged in the vibration probe 130 to output the light as an electrical signal; and a processor 170 processing the electrical signal to output a state (velocity) of the vibration as an output voltage value Vout.

As illustrated in FIG. 2, the optical fiber type vibration meter 100 includes a velocity pickup 150 converting a velocity of the weight 156 and the movable coil 158 arising from the vibration of the weight 156 and the movable coil 158 into an electrical current (which is proportional to the velocity); a solenoidal coil 148 generating a magnetic field by the electrical current; and a magnetic field sensor 131 attenuating an amount of light guided to the vibration probe 130 according to an intensity of the magnetic field.

In the following, a configuration of the optical fiber type vibration meter 100 is explained in more detail based on FIG. 1, FIG. 2 and FIG. 5.

As illustrated in FIG. 1, the optical fiber type vibration meter 100 has a detector 102 and the processor 170. As illustrated in FIG. 1, the detector 102 includes the light source 104; the incident side optical fiber 114; an optical fiber coupler 116; an outgoing side optical fiber 118; the optical receiver 120; and the vibration probe 130.

As illustrated in FIG. 1, the light source 104 has a laser diode, an LED, and the like. The incident side optical fiber 114 is connected to the light source 104, and guides light from the light source 104 to the vibration probe 130. It is also possible that a part of the light guided to the vibration probe 130 is photoelectric-converted by another optical receiver (not shown in the figure) and its output is monitored. According to the monitored output, an electrical signal output from the optical receiver 120 is made a normalized voltage value at a light receiver circuit 174. The optical fiber coupler 116 is formed by fusion joining the incident side optical fiber 114 and the outgoing side optical fiber 118. Light returning from the vibration probe 130 to the incident side optical fiber 114 is branched to the outgoing side optical fiber 118. The outgoing side optical fiber 118 is connected to the optical receiver 120. At the optical receiver 120, an incoming light, passing through the outgoing side optical fiber 118, is photoelectric-converted and output to the processor 170 as an electrical signal. For the incident side optical fiber 114 and the outgoing side optical fiber 118, a single mode fiber, a multimode fiber, a polarization-preserving type optical fiber, and the like, can be used.

As illustrated in FIG. 2, the vibration probe 130 includes the magnetic field sensor 131, the solenoidal coil 148, and the velocity pickup 150. These are integrally configured in a probe case 166. In this case, a vibration axis P of the weight 156 and the movable coil 158, a direction axis of the magnetic field generated at the solenoidal coil 148 and a magnetic field measurement axis O of the magnetic field sensor 131 are identical.

Figure 3:
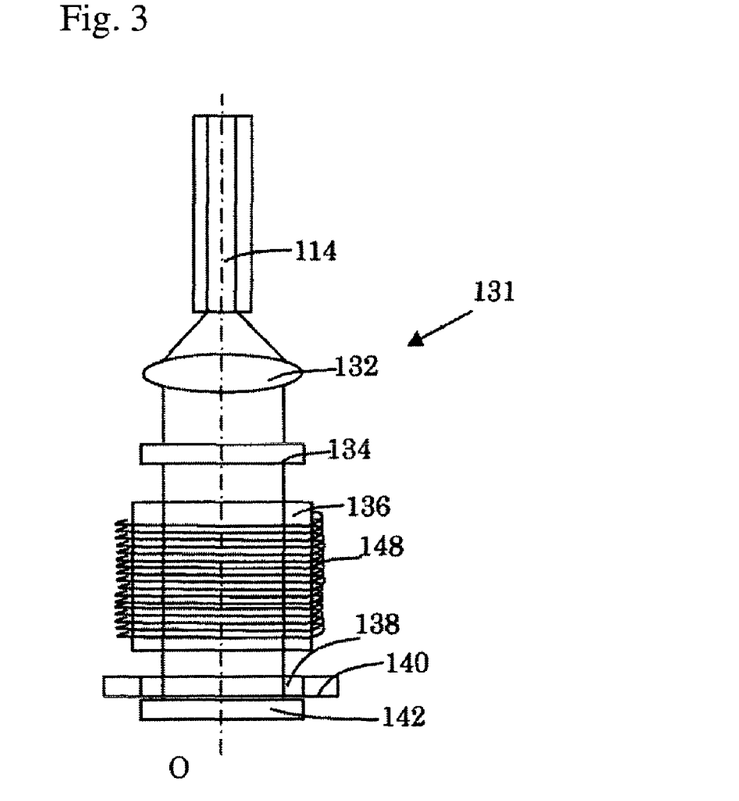
FIG. 3 is an enlarged pattern diagram of a magnetic field sensor of the vibration probe of the optical fiber type vibration meter according to the first embodiment of the present invention.

As illustrated in FIG. 3, the magnetic field sensor 131 includes a lens 132, a polarizer 134 (polarization plate), a first Faraday rotator 136, a second Faraday rotator 138, a permanent magnet 140, and a mirror 142.

As illustrated in FIG. 3, the lens 132 collimates light guided by the incident side optical fiber 114, and makes it incident to the polarizer 134. The polarizer 134 linearly polarizes the light outgoing from the incident side optical fiber 114 and being collimated. The first Faraday rotator 136 (Faraday rotator) rotates a transmission axis (called a polarization axis) of (performs polarization rotation to) the linearly polarized light (also simply called linear polarization) that has passed through the polarizer 134, by an intensity of a magnetic field in the magnetic field measurement axis direction O. The second Faraday rotator 138 is arranged at a subsequent stage of the first Faraday rotator 136, separately from the first Faraday rotator 136. At an external periphery of the second Faraday rotator 138, the ring-shaped permanent magnet 140 is arranged. This permanent magnet 140 applies a bias magnetic field to the second Faraday rotator 138. Thereby, the second Faraday rotator 138 further provides a polarization rotation angle of 22.5 degrees to a polarization rotation angle of the light outgoing from the first Faraday rotator 136.

As illustrated in FIG. 3, at an end of the magnetic field sensor 131, the mirror 142 is arranged. The mirror 142 vertically reflects the light that has been polarization-rotated by the second Faraday rotator 138. The light reflected by the mirror 142 is again provided with a polarization rotation angle of 22.5 degrees at the second Faraday rotator 138. That is, with respect to the polarization axis of the polarizer 134, the second Faraday rotator 138 further provides a certain polarization rotation angle of 45 degrees to the polarization rotation angle of the light outgoing from the first Faraday rotator 136. And, the light reflected by the mirror 142 is made incident to the polarizer 134. For both the first Faraday rotator 136 and the second Faraday rotator 138, a material having the Faraday effect (mainly a YIG crystal and the like) can be used. In this case, a YIG crystal having a large Verdet constant is more desirable.

Figure 4:
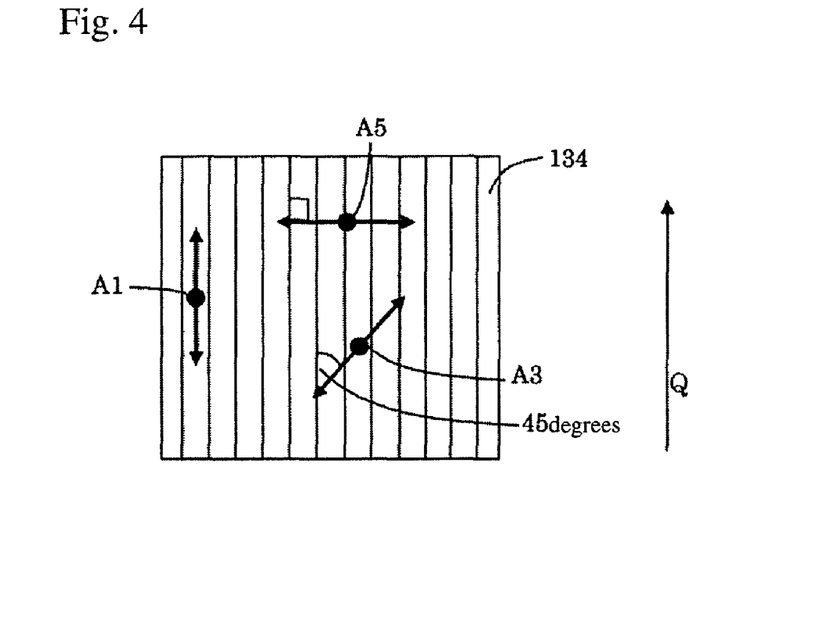
FIG. 4 is a pattern diagram explaining a relationship between a polarization axis of a polarizer and a transmitted light amount.

Here, FIG. 4 is used to explain that, with respect to the polarization axis of the polarizer 134, the second Faraday rotator 138 further provides a certain polarization rotation angle of 45 degrees to the polarization rotation angle of the light outgoing from the first Faraday rotator 136. In this regard, it is assumed for the present explanation that a component of light in the polarization axis direction transmits 100% at the polarizer 134 (a loss other than due to a polarization direction is ignored).

In FIG. 4, when a polarization axis Q of the polarizer 134 and a linear polarization A1 are parallel to each other (with respect to the polarization axis Q, a polarization rotation angle of the linear polarization (called an azimuthal angle) is 0 degree), the linear polarization A1 transmits 100% with respect to the polarizer 134. However, when the polarization axis Q and a linear polarization A5 are perpendicular to each other (azimuthal angle is 90 degrees), the linear polarization A5 does not transmit at all (0% transmission) with respect to the polarizer 134. As an intermediate case, when the polarization axis Q and a linear polarization A3 form a 45 degree angle (azimuthal angle is 45 degrees), the linear polarization A3 transmits 70.7% (according to cos(45 degrees)=0.707) with respect to the polarizer 134. That is, in the present embodiment, even without a magnetic field, the second Faraday rotator 138 provides a polarization rotation angle of 45 degrees to the linear polarization by the polarizer 134. Therefore, even without a magnetic field, an amount of light returning to the incident side optical fiber 114 via the polarizer 134 is attenuated (modulated) to only 70.7% of the amount of light of the linear polarization outgoing from the polarizer 134.

In order to reduce an effect of the permanent magnet 140 on the first Faraday rotator 136, a magnetic shield may be provided at an external periphery of the permanent magnet 140. For example, the magnetic shield can be configured to cover peripheries of the second Faraday rotator 138, the permanent magnet 140 and the mirror 142, and have an opening only at a light passing section. As the magnetic shield, for example, a perm alloy and the like can be used. Without providing a magnetic shield, it is also possible to arrange the permanent magnet 140 and the first Faraday rotator 136 sufficiently separated so as to avoid creating a magnetic effect on the first Faraday rotator 136 by the permanent magnet 140.

The Faraday effect is a phenomenon that a polarization plan rotates in proportion to an intensity of a magnetic field. With respect to the Faraday effect, equation (1) holds:

$$\Phi \propto V \times H \times L \qquad (1)$$

Here the symbol $\Phi$ is a Faraday rotation angle (a polarization rotation angle of light). The symbol V is a Verdet constant and varies according to the material of a Faraday rotator. The symbol H represents an intensity of a magnetic field along a propagation direction of light (magnetic field detection axis O direction). The symbol L is a length of the magnetic field detection axis O direction of a Faraday rotator.

Here, a polarization rotation of a (linearly polarized) light occurs when there exists a component of a magnetic field along the propagation direction of the light (the magnetic field detection axis O direction). In detail, in the Faraday effect, when the direction of a magnetic field is the same as the propagation direction of light, the polarization of the light rotates in a rotating direction of a right-handed screw with respect to the propagation direction of the light. When the direction of the magnetic field is opposite to the propagation direction of the light, the polarization of the light rotates in a rotating direction of a left-handed screw with respect to the propagation direction of the light.

As illustrated in FIG. 2 and FIG. 3, the solenoidal coil 148 is a coil arranged at an external periphery of the first Faraday rotator 136. The solenoidal coil 148 is electrically connected to the movable coil 158 of the velocity pickup 150 (to be described later).

A magnetic flux density generated at the solenoidal coil 148 is proportional to an electrical current, according to the Ampere's law, and the relation of equation (2) holds. And, a magnetic flux density is proportional to an intensity of a magnetic field.

$$B1 \propto n1 \times L1 \times I \qquad (2)$$

Here, the symbol B1 is a magnetic flux density along an axis direction inside the solenoidal coil 148. The symbol n1 is a number of coil turns per unit length in the axis direction of the solenoidal coil 148. The symbol L1 is a length in the axis direction of the solenoidal coil 148. The symbol I is an electrical current flowing in the solenoidal coil 148.

Figure 5:
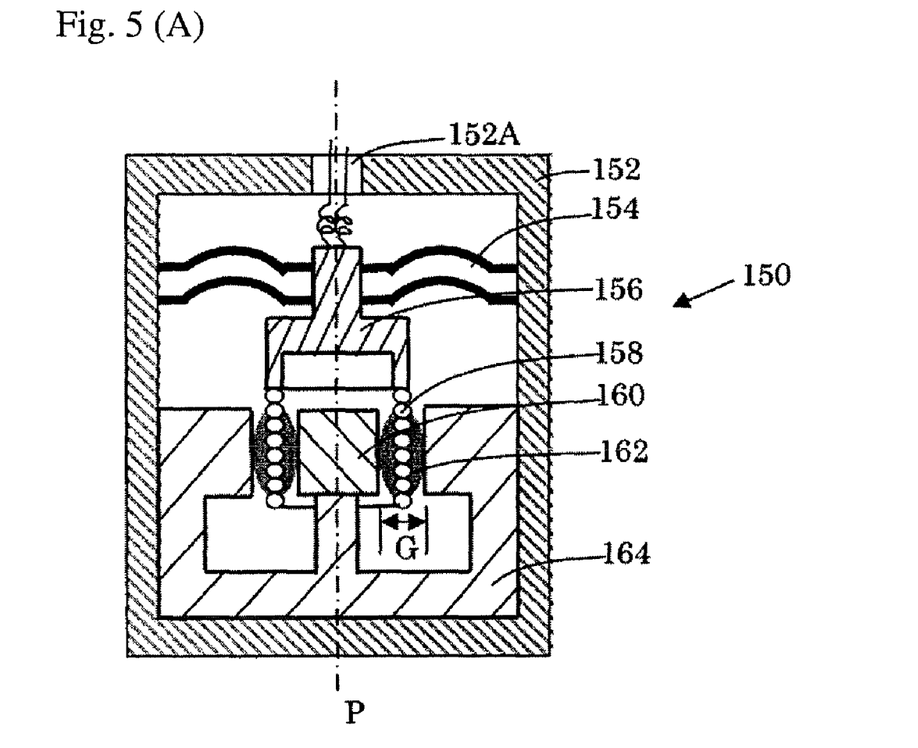
FIG. 5 is an enlarged pattern diagram of a velocity pickup according to the first embodiment of the present invention.

As illustrated in FIG. 2 and FIG. 5, the velocity pickup 150 includes a spring 154, the weight 156, the movable coil 158, a permanent magnet 160, and a yoke 164. These are covered with a shield case 152 in order to shield an effect due to a magnetic field external to the velocity pickup 150. That is, in the present embodiment, the shield case 152 can also shield effects due to a magnetic field of the permanent magnet 140 of the magnetic field sensor 131 and a magnetic field generated at the solenoidal coil 148.

As illustrated in FIG. 2 and FIG. 5, an external periphery of the spring 154 is fixed on the shield case 152. The spring 154 supports the weight 156 with its center, allowing the weight 156 to displace along the vibration axis P (diaphragm construction). A concave portion is formed on a downside of the weight 156. And, along a circumferential direction of the concave portion, the ring-shape movable coil 158 is integrally fixed to the downside of the weight 156. The movable coil 158 is electrically connected to the solenoidal coil 148 through a through-hole 152A formed on the shield case 152, to form a closed circuit. That is, the movable coil 158 is a coil connected to the solenoidal coil 148. On the inner side of the movable coil 158, the permanent magnet 160, shaped following the inner side of the movable coil 158, is arranged.

A clearance between an external periphery of the permanent magnet 160 and an inner periphery of the movable coil 158 is uniform in a circumferential direction. The permanent magnet 160 is fixed on the yoke 164 surrounding an external periphery of the movable coil 158 with a predetermined clearance G. For this reason, magnetic flux (magnetic field) is generated between the permanent magnet 160 and the yoke 164. Therefore, it is in a state in which the permanent magnet 160 is applying a magnetic field to the movable coil 158. And, with respect to the permanent magnet 160, the movable coil 158 vibrates. That is, in the velocity pickup 150, a velocity of a vibration is directly detected. According to such a principle, the velocity pickup 150 can detect a vibration from a relatively low frequency to a high frequency (from a few Hz to a few kHz).

The symbol 162 is for a magnetic fluid, which has a function of damping a motion of the movable coil 158. Using the magnetic fluid 162 allows stabilizing a damping material between the permanent magnet 160 and the yoke 164. However, it is not necessary that a damping material has to be a magnetic fluid. For example, it is also possible to use a gas, a liquid, and the like, such as an air, a water and an oil.

An output electrical current of the velocity pickup 150, according to the Fleming's right hand rule, is proportional to a velocity component of a vibration, and equation (3) holds.

$$I \propto B2 \times L2 \qquad (3)$$

Here, the symbol I is an electrical current flowing in the movable coil 158. The symbol B2 is a magnetic flux density in the clearance G between the permanent magnet 160 and the yoke 164. The symbol L2 is a length of the movable coil 158 cutting across the magnetic flux.

As illustrated in FIG. 1, the processor 170 includes a light emitting circuit 172, the light receiver circuit 174, a squaring circuit 176 (which is a squarer), and an offset circuit 178 (which is an offsetter). Further, the processor 170 may include a differentiation circuit 180 (which is a differentiator).

As illustrated in FIG. 1, the light emitting circuit 172 allows the light source 104 to provide a stable emission of light. The light receiver circuit 174 outputs an electrical signal output from the optical receiver 120 as a normalized voltage value to the squaring circuit 176. The squaring circuit 176 squares the voltage value output from the light receiver circuit 174 and outputs a squared voltage value. Here, when the normalized voltage value is 70.7% with respect to a normalization value, the squared voltage value output from the squaring circuit 176 is 0.5 (=0.707²; a value of 50% with respect to a normalized squared voltage value). The offset circuit 178 uses a squared voltage value of 0.5 as an offset, performs a gain adjustment, inverts a sign of plus or minus when needed, and outputs the value as an output voltage value Vout. That is, the output voltage value Vout corresponds to a velocity output of a vibration. The differentiation circuit 180 performs differentiation of the output voltage value Vout of the offset circuit 178. This processing, since the output voltage value Vout corresponds to a velocity of a vibration, is added when an acceleration output of a vibration is desired (in that case, it is also possible for the acceleration output to be an output voltage value).

Next, operation of the optical fiber type vibration meter 100 of the present embodiment is explained mainly using FIG. 1 and FIG. 2.

When the vibration probe 130 vibrates along the vibration axis P direction, the weight 156 of the velocity pickup 150 vibrates with respect to the shield case 152. On the shield case 152, the permanent magnet 160 and the yoke 164 are fixed. Meanwhile, on the weight 156, the movable coil 158 is fixed.

Therefore, due to the vibration of the weight 156, the movable coil 158 cuts across the magnetic flux occurring between the permanent magnet 160 and yoke 164. Therefore, according to the Fleming's right hand rule, an electrical current proportional to a velocity of the movable coil 158 is generated in the movable coil 158.

The electrical current generated in the movable coil 158 flows directly to the solenoidal coil 148. Then, according to the Ampere's law, magnetic flux (magnetic field) is generated inside the solenoidal coil 148. That is, inside the first Faraday rotator 136, a magnetic field along the magnetic field measurement axis O direction is generated.

Meanwhile, light is emitted from the light source 104 by the light emitting circuit 172. The light emitted from the light source 104 is guided by the incident side optical fiber 114.

The guided light is emitted from the incident side optical fiber 114, and is collimated by the lens 132. The collimated light is made incident to the polarizer 134, and is linearly polarized. The linearly polarized light is polarization-rotated at the first Faraday rotator 136 by an intensity of the magnetic field generated along the magnetic field measurement axis O direction. The polarization-rotated light is further polarization-rotated for 22.5 degrees at the second Faraday rotator 138. Then, the light is vertically reflected by the mirror 142, and is again further polarization-rotated for 22.5 degrees at the second Faraday rotator 138. That is, the second Faraday rotator 138 provides a certain polarization rotation angle of total 45 degrees. The light passing through the second Faraday rotator 138 is further polarization-rotated also at the first Faraday rotator 136. The light is made incident to the polarizer 134, and, according to an azimuthal angle with respect to the polarization axis of the polarizer 134, attenuates to pass through (being modulated).

The attenuated (modulated) light is again returning to the incident side optical fiber 114 at the lens 132. That is, in the magnetic field sensor 131, according to the intensity of the magnetic field generated at the solenoidal coil 148, the light guided to the vibration probe 130 is attenuated and then returned. Via the optical fiber coupler 116, the returning light is guided by the outgoing side optical fiber 118 to the optical receiver 120.

Figure 6:
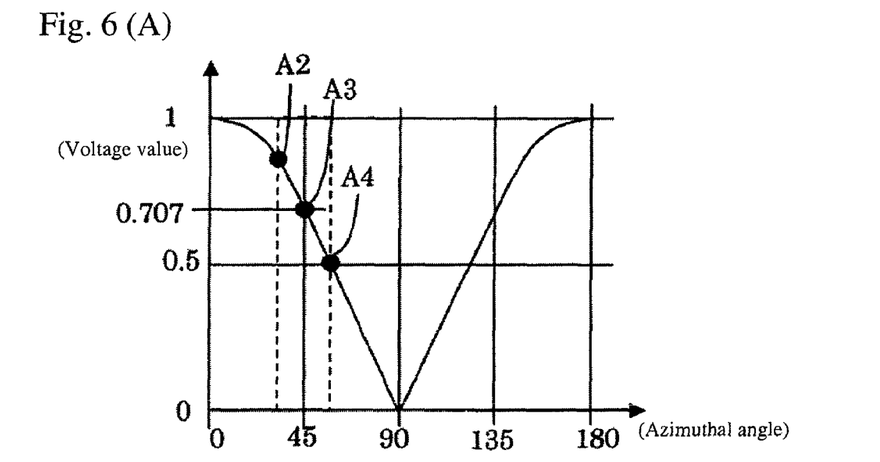
FIG. 6 is pattern diagram expressing a state of a signal after an optical receiver of the vibration probe according to the first embodiment of the present invention.

The optical receiver 120 performs a photoelectric conversion in proportion to the amount of the returning light (optical fiber feedback light amount) and outputs an electrical signal. The electrical signal is output by the light receiver circuit 174 as a normalized voltage value. An example of this voltage value is illustrated in FIG. 6 (A). The voltage value, according to an attenuation characteristic of the polarizer 134, is expressed as a value on a curve of a sine wave characteristic (SIN wave). In the case of A3, where a magnetic field does not exist, the second Faraday rotator 138 (and the permanent magnet 140) provides a 45 degrees as a certain polarization rotation angle to light. Therefore, for an azimuthal angle of 45 degrees as in a state of A3, for which a magnetic field does not exist, the voltage value is not a maximum value or a minimum value; the voltage value is 0.707. In the case of A2, where a magnetic field is minus, the azimuthal angle is less than 45 degrees. Therefore, the voltage value is larger than 0.707. In an opposite manner, in the case of A4, where a magnetic field is plus, the azimuthal angle is larger than 45 degrees. Therefore, the voltage value is less than 0.707.

That is, the magnetic field sensor 131 changes an amount of light guided to the vibration probe 130 also according to a direction of a magnetic field generated at the solenoidal coil 148. In other words, by providing, as a bias, a certain non-90n degrees (where n is an integer) polarization rotation angle to the polarization rotation angle of light outgoing from the first Faraday rotator 136 with respect to the polarization axis of the polarizer 134, a plus or minus sign of a magnetic field (that is, a direction of the magnetic field) can be easily determined from an voltage value in proportion to the amount of light received.

The voltage value output from the light receiver circuit 174 is squared by the squaring circuit 176. That is, the squared voltage value output from the squaring circuit 176, as an example, can be illustrated as in FIG. 6 (B). That is, the voltage value of 0.707 of the state of A3, for which a magnetic field does not exist, becomes a squared voltage value of 0.5. At the same time, the curve expressing a sine wave characteristic can become extremely close to a straight line in a range B centered on a squared voltage value of 0.5. That is, in the range B centered on an azimuthal angle of 45 degrees, an azimuthal angle can be obtained in proportion to a squared voltage value. That is, without the need of a complex configuration, the intensity of the magnetic field, including the direction of the magnetic field, can be accurately obtained.

An output of the squaring circuit 176 is subjected to a sign adjustment, an offset adjustment and a gain adjustment at the offset circuit 178. That is, an output voltage value output from the offset circuit 178, as an example, can be illustrated as in FIG. 6 (C). Therefore, with a simple configuration, the intensity of the magnetic field, including the direction of the magnetic field, can be easily and accurately obtained. Here, what is detected at the velocity pickup 150 is the velocity. Therefore, according to the voltage value output from the offset circuit 178, representing the intensity of the magnetic field, the velocity of the vibration can be accurately obtained.

The voltage value output from the offset circuit 178 is subjected to a differentiation operation at the differentiation circuit 180. That is, from the fact that a velocity is obtained at the offset circuit 178, when the differentiation circuit 180 is added, acceleration can be accurately obtained.

In the present embodiment, a velocity of a vibration is directly detected. The velocity pickup 150 can detect a vibration from a relatively low frequency to a high frequency (from a few Hz to a few kHz). That is, the present embodiment is broadly applicable to earthquake observation, machine vibration, equipment diagnosis, and the like.

Further, in the present embodiment, the permanent magnet 140 is used to apply a bias magnetic field to the second Faraday rotator 138. Therefore, there is no need for an external wiring for the vibration probe 130 other than the incident side optical fiber 114. Therefore, there is a great flexibility for the arrangement of the vibration probe 130, and a stable output can be obtained from the vibration probe 130 without externally controlling the second Faraday rotator 138 and the velocity pickup 150.

Further, in the present invention, by using the mirror 142 to reflect light, the light travels reciprocally along the respective magnetic field measurement axis O direction of the first Faraday rotator 136 and the second Faraday rotator 138. Therefore, the length of the magnetic field measurement axis O direction of the first Faraday rotator 136 and the second Faraday rotator 138 can be shortened. Therefore, the vibration probe 130 can be made in a small size. Further, the mirror 142 functionally is a terminal member of the magnetic field sensor 131. Therefore, no member such as an optical fiber is arranged on the outside of the mirror 142, thereby making installation into the vibration probe 130 easy.

Further, in the present embodiment, in the vibration probe 130, the vibration axis P of the weight 156 and the movable coil 158, the direction axis of the magnetic field generated at the solenoidal coil 148, and the magnetic field measurement axis O of the magnetic field sensor 131, are identical, and the velocity pickup 150, the solenoidal coil 148, and magnetic field sensor 131, are integrally configured. Therefore, handling of the vibration probe 130 is easy. And, axis alignment of the vibration axis P with respect to an object of a vibration measurement, and assembling of the vibration probe 130 itself, can be easily performed.

Further, in the present embodiment, the velocity pickup 150 is covered with the shield case 152 in order to shield an effect due to a magnetic field external to the velocity pickup 150. Therefore, with respect to the velocity pickup 150, effects of the magnetic field sensor 131, the solenoidal coil 148, and an external magnetic field (including an electromagnetic field), can be shielded. That is, credibility of a detected state of a vibration can be enhanced.

That is, in the present embodiment, while relying on the advantage of using an optical fiber, high precision measurement is possible without the need of a complex configuration. That is, it is possible for a long distance signal transmission maintaining signal quality as output from the vibration probe 130, without the need of power feeding during the transmission. At the same time, heat generation is also reduced, and it can be made slim and light-weighted. Further, high explosion proof can be maintained. At the same time, the velocity pickup 150 directly detects a velocity, thereby preventing an offset error due to static gravity.

In the present embodiment, the second Faraday rotator 138 is used, and it is desirable that the permanent magnet 140 does not affect the first Faraday rotator 136. However, the present invention is not limited to this. It is also possible that, without using a second Faraday rotator, a permanent magnet is used to apply a bias magnetic field to a first Faraday rotator to provide a certain polarization rotation angle at the first Faraday rotator, and a magnetic field generated at a solenoidal coil is superimposed on the bias magnetic field.

Further, in the present embodiment, the optical fiber coupler 116 is used. However, the present invention is not limited to this. For example, it is also possible to use a beam splitter that is not of an optical fiber type.

Further, in the present embodiment, the processor 170 included the squaring circuit 176 as a squarer, the offset circuit 178 as an offsetter, and the differentiation circuit 180 as a differentiator. However, the present invention is not limited to this. It is also possible to realize a squarer, an offsetter, and a differentiator by performing A/D conversion to an output of a light receiver circuit and performing a software arithmetic processing, without taking the form of circuits.

Further, in the present embodiment, the second Faraday rotator 138 is arranged at a subsequent stage of the first Faraday rotator 136, and the permanent magnet 140 is arranged at the external periphery of the second Faraday rotator 138. However, the present invention is not limited to this. It is also possible to arrange a second Faraday rotator at a previous stage of a first Faraday rotator. And, it is also possible to arrange a permanent magnet apart from a second Faraday rotator with respect to the magnetic field detection axis O direction. It is also possible that the shape of the permanent magnet is not a ring shape.

Figure 7:
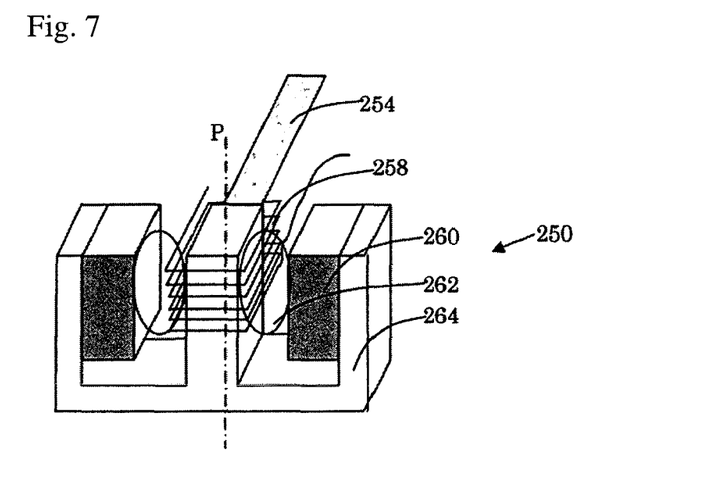
FIG. 7 is an enlarged pattern diagram of a velocity pickup according to a second embodiment of the present invention.

Further, in the present embodiment, the weight 156 is supported by the circular plate shaped spring 154, the permanent magnet 160 of the velocity pickup 150 is arranged in a shape following the inner periphery of the movable coil 158, and the yoke 164 is arranged in a ring shape on the outside of the movable coil 158. However, the present invention is not limited to this. For example, as in a velocity pickup 250 according to a second embodiment of the present invention as illustrated in FIG. 7, it is also possible to use a plate spring 254 to cantilever a movable coil 258, which is integrally configured with a weight. And, it is also possible to fix two square permanent magnets 260 on outer portions of a yoke 264 in such a way that the permanent magnets 260 face a portion of the yoke 264 inside the movable coil 258. Of course, it is also possible to arrange permanent magnets both inside and outside a movable coil. In that case, it is not limited to a bi-directional arrangement. And, a magnetic pole may be in any direction.

Further, in the above-described embodiment, in the vibration probe, the vibration axis P of the weight and the movable coil, the direction axis of the magnetic field generated at the solenoidal coil, and the magnetic field measurement axis O of the magnetic field sensor, are identical, and the velocity pickup, the solenoidal coil, and the magnetic field sensor, are integrally configured. However, the present invention is not limited to this. It is also possible to have the magnetic field sensor and the solenoidal coil integrally configured, but the velocity pickup alone separately configured. And, even when these are integrally configured, it is also possible that the axes are not identical, but parallel, or even forming angles therebetween.

Figure 8:
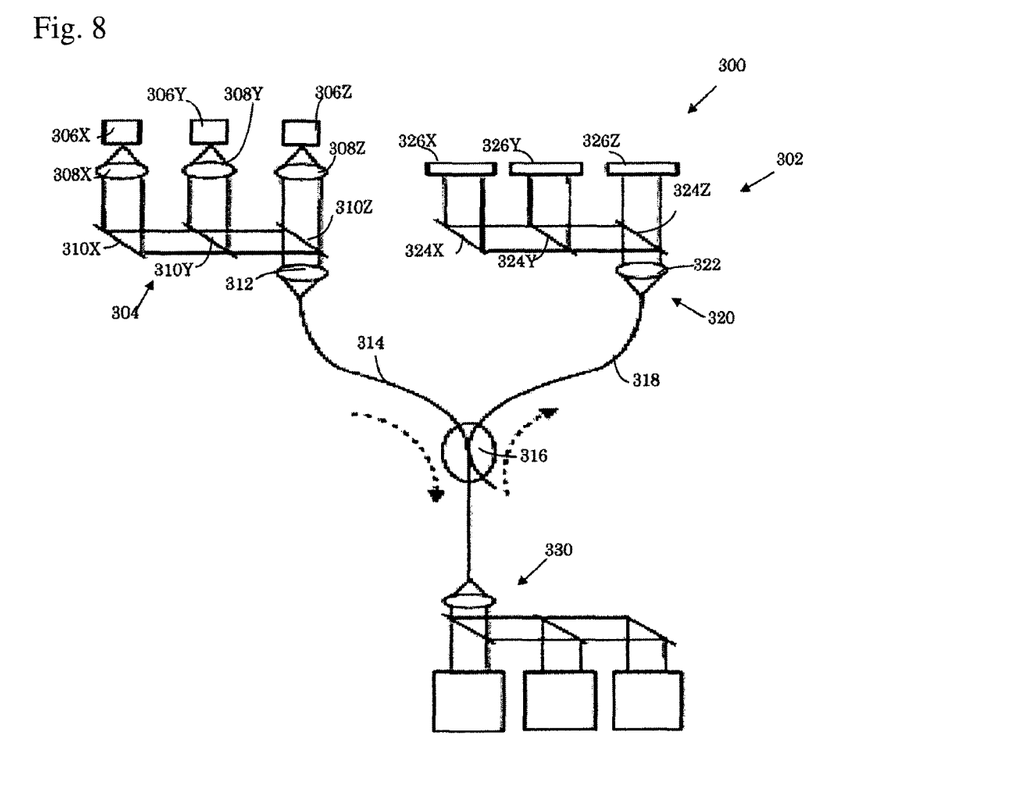
FIG. 8 is a schematic pattern diagram of a detector of an optical fiber type vibration meter according to a third embodiment of the present invention.
Figure 9:
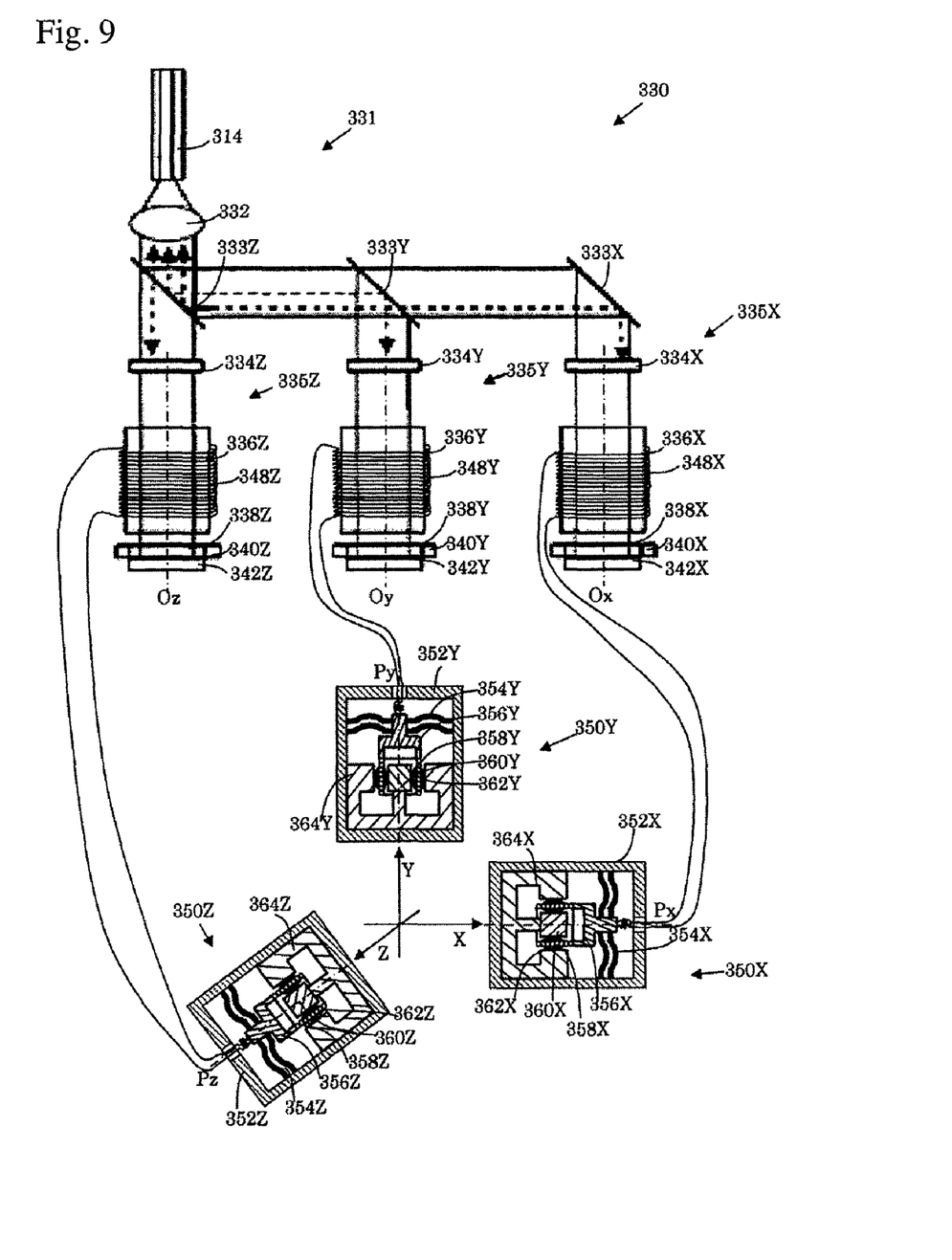
FIG. 9 is an enlarged pattern diagram of a vibration probe of the optical fiber type vibration meter according to the third embodiment of the present invention.

Next, a third embodiment of the present invention is explained using FIG. 8 and FIG. 9.

In the present embodiment, the reflection type vibration probe 130 of the first embodiment is made multiaxial. A schematic configuration of this is as illustrated in FIG. 8 and FIG. 9. Light of a plurality of wavelengths $\lambda 1$-$\lambda 3$ from a light source 304 is guided to an incident side optical fiber (optical fiber) 314. At a vibration probe 330, light outgoing from the incident side optical fiber 314 is dispersed into each of the wavelengths $\lambda 1$-$\lambda 3$, and is modulated (attenuated) by vibrations detected at the same number of velocity pickups 350X-350Z as the wavelengths. In this case, the light outgoing from the incident side optical fiber 314 is dispersed into each of the wavelengths by two dichroic mirrors 333Y and 333Z. Specific configuration is explained in the following. Other than related to a part involving multiaxial, explanation is omitted as appropriate.

As illustrated in FIG. 8, the light source 304, for example, includes three LEDs 306X-306Z, four lenses 308X-308Z and 312, one mirror 310X and two dichroic mirrors 310Y and 310Z. The three LEDs 306X-306Z respectively emit light of different wavelengths $\lambda 1$-$\lambda 3$. The light emitted from the LEDs 306X-306Z is respectively collimated by the lenses 308X-308Z. The collimated light is reflected by the mirror 310X and the dichroic mirrors 310Y and 310Z, and is made incident to the lens 312. Via the lens 312, the light having respectively different wavelengths $\lambda 1$-$\lambda 3$ is guided by the one incident side optical fiber 314 to the vibration probe 330.

As illustrated in FIG. 9, the vibration probe 330 includes a magnetic field sensor 331, solenoidal coils 348X-348Z, and velocity pickups 350X-350Z.

As illustrated in FIG. 9, the magnetic field sensor 331 includes three sensor distal portions 335X-335Z, having only a lens 332 in common. The sensor distal portions 335X-335Z include, respectively, a mirror 333X or dichroic mirrors 333Y and 333Z, polarizers 334X-334Z, first Faraday rotators 336X-336Z, second Faraday rotators 338X-338Z, permanent magnets 340X-340Z, and mirrors 342X-342Z.

As illustrated in FIG. 9, light outgoing from the incident side optical fiber 314 is collimated by the lens 332. The collimated light is made incident to the dichroic mirror 333Z. Here, the dichroic mirror 333Z reflects light of wavelengths $\lambda 1$ and $\lambda 2$, and transmits light of wavelength $\lambda 3$. The light reflected by the dichroic mirror 333Z is made incident to the dichroic mirror 333Y. The dichroic mirror 333Y transmits light of wavelength $\lambda 1$ and reflects light of wavelength $\lambda 2$.

The light transmitted through the dichroic mirror 333Y is reflected by the mirror 333X. The light dispersed by the mirror 333X and the dichroic mirrors 333Y and 333Z is respectively made incident to the mirrors 342X-342Z via the polarizers 334X-334Z, the first Faraday rotators 336X-336Z and the second Faraday rotators 338X-338Z. The light reflected by the mirrors 342X-342Z is respectively guided to the incident side optical fiber 314 via the mirror 333X and the dichroic mirrors 333Y and 333Z. Other configuration and operation of the magnetic field sensor 331 are the same as in the first embodiment, and therefore, the description thereof is not repeated.

In FIG. 9, configuration and operation of each of the solenoidal coils 348X-348Z and the velocity pickups 350X-350Z are the same as in the first embodiment, and therefore, the description thereof is not repeated. However, the velocity pickups 350X-350Z are fixedly arranged to be perpendicular to each other. Therefore, magnetic field measurement axes Ox-Oz of the magnetic field sensor 331 and vibration axes Px-Pz of the velocity pickups 350X-350Z respectively are not identical, but are in different arrangement relationship. In this case, the magnetic field sensor 331 and the solenoidal coils 348X-348Z are integrally configured, and the velocity pickups 350X-350Z are integrally configured. On the other hand, positional relationship between the magnetic field sensor 331 and the velocity pickups 350X-350Z may be kept fixed, and may also be kept flexibly changeable.

As illustrated in FIG. 8, an optical receiver 320 includes a lens 322, a mirror 324X and dichroic mirrors 324Y and 324Z, and photoelectric sensors 326X-326Z. Light outgoing from an outgoing side optical fiber 318 is collimated by the lens 322, and is dispersed into each of the wavelengths $\lambda 1$-$\lambda 3$ by the dichroic mirrors 324Y and 324Z, and the dispersed light is respectively received by the photoelectric sensors 326X-326Z. The light received by the photoelectric sensors 326X-326Z is photoelectric-converted, and is output as electrical signals to a processor.

The processor has the same configuration as in the first embodiment, and performs the same operation. Therefore, the description thereof is not repeated. It is also possible to have the same number of processors as the wavelengths and arrange the processors in parallel. It is also possible to share a processor as appropriate for different wavelengths.

As described above, the sensor distal portions 335X-335Z are respectively provided for each of the wavelengths $\lambda 1$-$\lambda 3$, and can be arranged in such a way that the vibration axes Px-Pz of the velocity pickups 350X-350Z are mutually perpendicular. By doing this, it is possible to measure a state of a three-dimensional vibration. That is, by vector-synthesizing output voltage values Vout obtained with respect to the axes, a direction and a magnitude (of a velocity) of a vibration can be obtained (same with respect to an acceleration of a vibration).

In making it multiaxial, the magnetic field sensor 331 is used. Therefore, arrangement of the sensor distal portions 335X-335Z is easy. At the same time, by using the two dichroic mirrors 333Y and 333Z, the vibration probe 330 can be compactly assembled in a synergistic manner. And, the two dichroic mirrors 324Y and 324Z are also used in the optical receiver 320. Therefore, the optical receiver 320 also can be compactly assembled.

Figure 10:
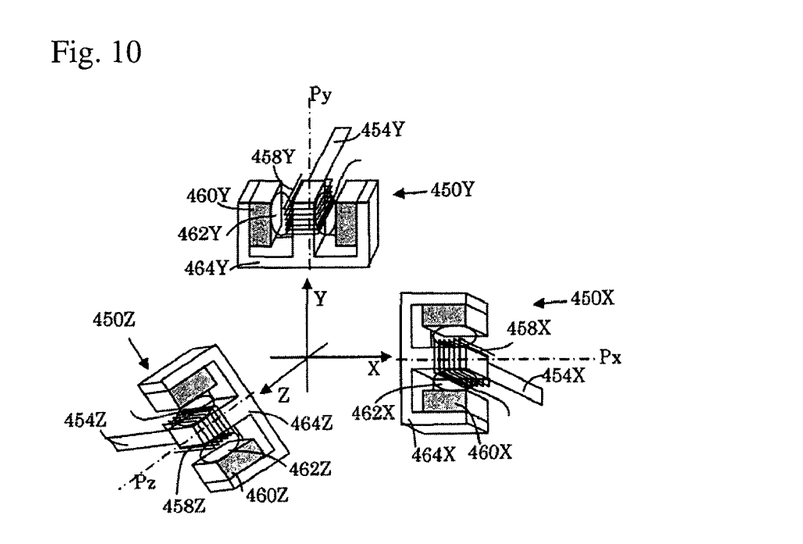
FIG. 10 is an enlarged pattern diagram of a velocity pickup according to a fourth embodiment of the present invention.

In the present embodiment, the same configuration as the velocity pickup 150 described in the first embodiment is used for each of the velocity pickups 350X-350Z. However, it is also possible to use the velocity pickup 250 (FIG. 7) described in the second embodiment to make it multiaxial (a fourth embodiment illustrated in FIG. 10).

Figure 11:
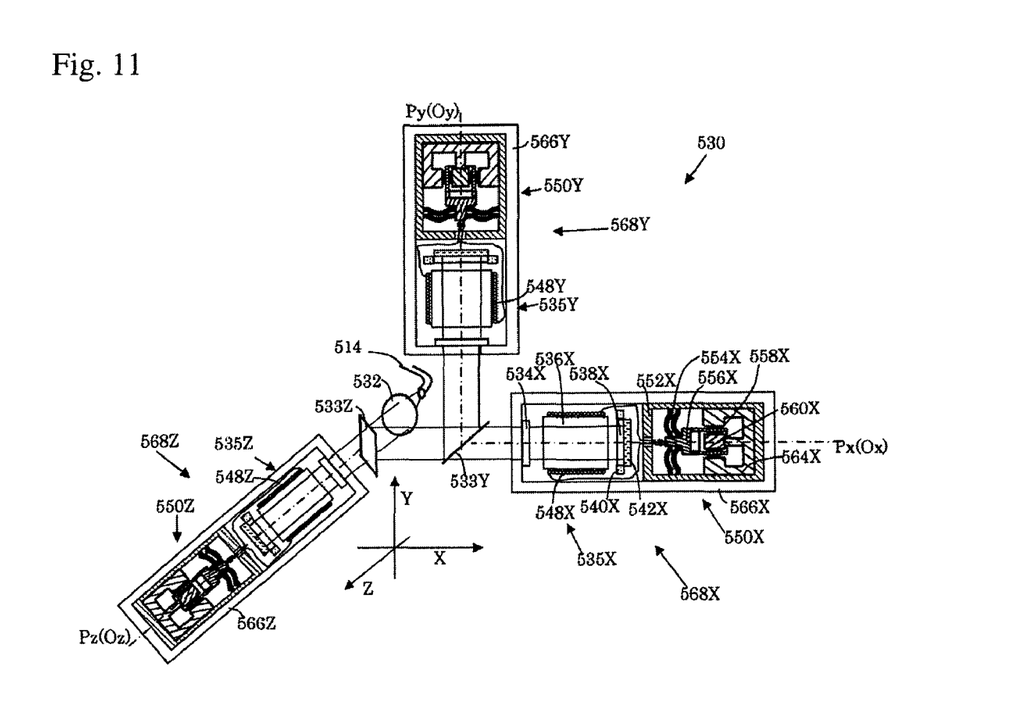
FIG. 11 is an enlarged pattern diagram of a vibration probe according to a fifth embodiment of the present invention.

In the above-described embodiment, the magnetic field sensor is divided into a plurality of sensor distal portions using a minor and dichroic mirrors, and velocity pickups are provided, having respectively different positional relationships with respect to the sensor distal portions. However, the present invention is not limited to this. For example, as described in a fifth embodiment as illustrated in FIG. 11, a vibration probe 530 may be configured to have 3 mutually perpendicular probe distal portions 568X-568Z, which are formed by respectively integrally configuring sensor distal portions 535X-535Z and velocity pickups 550X-550Z. In the vibration probe 530, a lens 532 is provided in common, and the 3 probe distal portions 568X-568Z are arranged directly mutually perpendicular by using dichroic mirrors 533Y and 533Z. In the probe distal portions 568X-568Z, magnetic field measurement axes Ox-Oz of the sensor distal portions 535X-535Z and vibration axes Px-Pz of the velocity pickups 550X-550Z are respectively identical, and the sensor distal portions 535X-535Z and the velocity pickups 550X-550Z are respectively integrally configured using probe cases 566X-566Z.

In the above-described embodiment, a state of a vibration along 3 axis directions is obtained using 3 wavelengths $\lambda 1$-$\lambda 3$. However, the present invention is not limited to this, but is also applicable to a case of a greater number of axes. As far as an optical fiber is used, wavelength multiplexing is easy. And, only one optical fiber is required. Further, it is not necessary to involve in any way any electrical signal in a vibration probe. Therefore, even for a case of a large number of axes, a vibration probe can be easily configured. Even when a vibration probe is arranged far away from a light source and an optical receiver, a state of a vibration with respect to each of the axes can be stably obtained.

In the above-described embodiment, light outgoing from an incident side optical fiber is dispersed into each of the wavelengths $\lambda 1$-$\lambda 3$ by two dichroic mirrors. However, the present invention is not limited to this. It is also possible to use an optical element having a different wavelength selectivity in place of a dichroic mirror.

Figure 12:
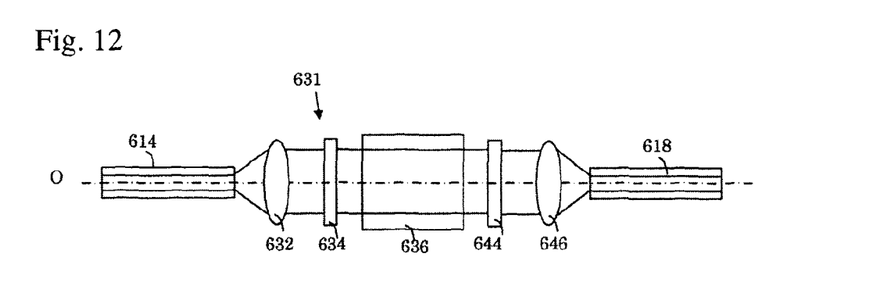
FIG. 12 is an enlarged pattern diagram of a magnetic field sensor according to a sixth embodiment of the present invention.
Figure 13:
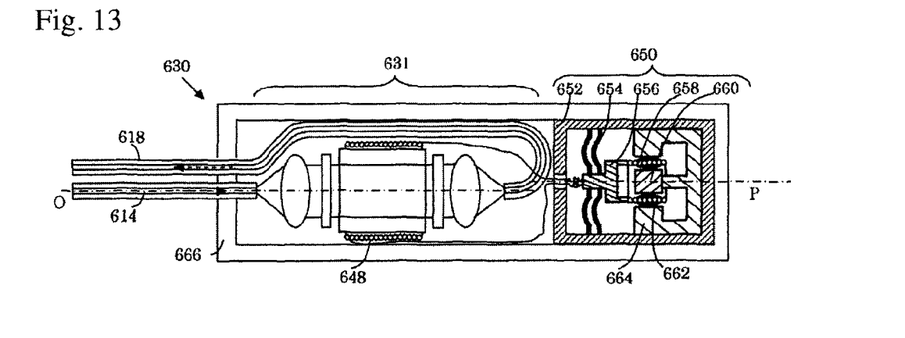
FIG. 13 is an enlarged pattern diagram of a vibration probe according to the sixth embodiment of the present invention.

Next, a sixth embodiment of the present invention is explained using FIG. 12 and FIG. 13.

As illustrated in FIG. 12 and FIG. 13, the present embodiment, different from the first embodiment, uses a transmission type magnetic field sensor 631. That is, in place of the second Faraday rotator 138, the permanent magnet 140, the mirror 142 and the polarizer 134 (when a reflected light returns) in the first embodiment, an analyzer 644 is used.

The analyzer 644 is arranged to have a polarization axis angle different from that of a polarizer 634 (for example, 45 degrees). And, light passing through the analyzer 644 is collected by a lens 646, and is made directly incident to an outgoing side optical fiber 618. That is, the analyzer 644, with a polarization axis 45 degrees different from the polarization axis of the polarizer 634 (providing a polarization rotation angle of 45 degrees), in place of the polarizer 634, passes light outgoing from a first Faraday rotator 636. For this reason, as compared to the first embodiment, the analyzer 644 further provides as a bias a certain non-90n degrees (where n is an integer) polarization rotation angle (for example, 45 degrees), to the polarization rotation angle of light outgoing from the first Faraday rotator 636, with respect to the polarization axis of the polarizer 634, and, according to the polarization rotation angle, attenuates amount of light guided to an optical receiver.

As illustrated in FIG. 13, for a vibration probe 630, a velocity pickup same as in the first embodiment can be used. In this case, in the magnetic field sensor 631, the outgoing side optical fiber 618 on the velocity pickup side is folded back toward the same direction as an incident side optical fiber 614. In this case, a magnetic field measurement axis O of the magnetic field sensor 631 and a vibration axis P of a velocity pickup 650 are not identical, but are parallel. The magnetic field sensor 631, a solenoidal coil 648, and the velocity pickup 650 are integrally configured.

For this reason, in the present embodiment, the same operation as the optical fiber type vibration meter 100 described in the first embodiment is possible. Further, in the present embodiment, only the first Faraday rotator 636 is used. Therefore, as compared to the first embodiment, it is possible to lower costs. Further, a permanent magnet for applying a bias magnetic field is not used. Therefore, the vibration probe 630 can be configured and arranged without the need of considering an effect due to a permanent magnet on the first Faraday rotator 636.

Figure 14:
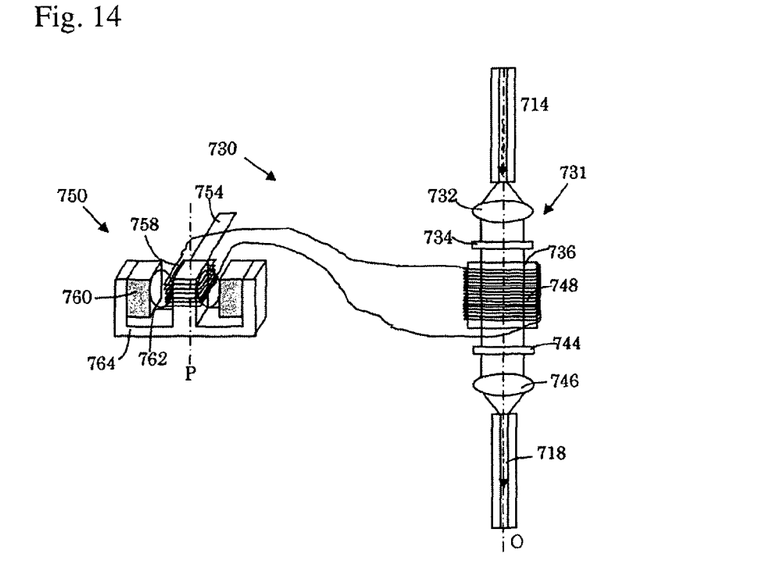
FIG. 14 is an enlarged pattern diagram of a vibration probe according to a seventh embodiment of the present invention.

Further, in the present embodiment, the vibration probe 630 using the velocity pickup described in the first embodiment is described. However, the present invention is not limited to this. For example, as in a seventh embodiment as illustrated in FIG. 14, it is also possible to use the velocity pickup described in the second embodiment. Also in this case, a magnetic field sensor 731 and a velocity pickup 750 may be integrally configured, and may also be configured in a changeable arrangement.

Further, it is also possible to use the transmission type vibration probe 630 of the present embodiment to make it multiaxial as described in the third-fifth embodiments.

The present invention is explained using the above described embodiments. However, the present invention is not limited to the above described embodiments. That is, improvements and design changes are possible without departing from the scope of the present invention.

In the above described embodiments, the certain polarization rotation angle was 45 degrees. However, the present invention is not limited to this. When the certain polarization rotation angle is 45 degrees, regardless of a direction of a magnetic field, an intensity of the magnetic field can be accurately obtained within an equal broad range when making a straight-line approximation (for example, in FIG. 6 (B), azimuthal angles are each within a range of B/2). For this reason, it is desirable that the certain polarization rotation angle, which is provided as a bias, is 45+90m degrees (where m is an integer). However, it may be also any non-90n degree angle (where n is an integer). In that case, an amount of light received, in a state where a magnetic field does not exist, is not a maximum value or a minimum value on a curve expressing a sine wave characteristic. For this reason, when the direction of the magnetic field changes, the amount of light received (the voltage value, the squared voltage value or the output voltage value) changes. Therefore, the direction of the magnetic field can be determined.

Further, in the above described embodiments, as a polarizer or an analyzer, a polarization plate, which was made of a polarizing film that was sandwiched between glasses, was assumed. However, the present invention is not limited to this. For example, a polarization beam splitter or a polarization element of a birefringent crystal (a calcite or the like) may also be used.

Further, in the above described embodiments, as a light source, a laser diode or an LED was used. However, something else may also be used. In this regard, it is desirable that it emits a light wavelength transparent with respect to the material of a Faraday rotator. For example, it is desirable that it is a light source of a wavelength of about 1 μm with respect to a YIG crystal.

Further, in the above described embodiments, the processor included a squaring circuit as a squarer squaring an electrical signal. However, the present invention is not limited to this. It is also possible not to have a squarer.

Further, in the above described embodiments, the magnetic field sensor changes the amount of light guided to the vibration probe also according to the direction of the magnetic field generated at the solenoidal coil. However, the present invention is not necessarily limited to this.

Further, in the above described embodiments, the magnetic field sensor included the polarizer linearly polarizing light guided to the vibration probe, and the first Faraday rotator rotating polarization of light passing through the polarizer by an intensity of a magnetic field. However, the present invention is not necessarily limited to this. As far as it is an element that, as a result, attenuates an amount of light by an intensity of a magnetic field, it can be used.

Further, in the above described embodiments, the velocity pickup had the movable coil, which was connected to the solenoidal coil, and the permanent magnet, which provided a magnetic field to the movable coil. In addition, the movable coil vibrated with respect to the permanent magnet. However, the present invention is not limited to this. For example, it is also possible that a coil, which is fixed on a shield case, is connected to the solenoidal coil, and a permanent magnet, which is supported by a spring, vibrates with respect to the coil.

Further, in the above described embodiments, the velocity pickup was covered with the shield case in order to shield an effect due to a magnetic field external to the velocity pickup. However, the present invention is not limited to this. It is also possible not to include a shield case.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A vibration meter comprising:
   a light source;
   an optical fiber configured to guide light from the light source;
   a vibration probe on which the guided light is incident;
   an optical receiver photoelectric-converting light configured to be modulated by a vibration of a movable member located in the vibration probe to output the light as an electrical signal;
   a processor configured to process the electrical signal to output a state of the vibration as an output voltage value;
   a velocity pickup configured to convert a velocity of the movable member resulting from the vibration of the movable member into an electrical current;
   a solenoidal coil configured to generate a magnetic field by the electrical current; and
   a magnetic field sensor configured to attenuate an amount of light guided to the vibration probe according to an intensity of the magnetic field.

2. The vibration meter according to claim 1, wherein the magnetic field sensor is configured to change an amount of light guided to the vibration probe also according to a direction of a magnetic field generated by the solenoidal coil.

3. The vibration meter according to claim 2, wherein the magnetic field sensor comprises:
   a polarizer configured to linearly polarize light guided to the vibration probe; and
   a Faraday rotator configured to rotate polarization of light passing through the polarizer by the intensity of the magnetic field.

4. The vibration meter according to claim 3, wherein the velocity pickup comprises:
   a coil connected to the solenoidal coil; and
   a permanent magnet configured to provide a magnetic field to the coil,
   and wherein the coil is configured to relatively vibrate with respect to the permanent magnet.

5. The vibration meter according to claim 4, wherein, in the vibration probe, a vibration axis of the movable member, a direction axis of a magnetic field generated by the solenoidal coil and a magnetic field measurement axis of the magnetic field sensor are one of being identical and being parallel, and
   the velocity pickup, the solenoidal coil and the magnetic field sensor are integrally configured.

6. The vibration meter according to claim 3, wherein, in the vibration probe, a vibration axis of the movable member, a direction axis of a magnetic field generated by the solenoidal coil and a magnetic field measurement axis of the magnetic field sensor are one of being identical and being parallel, and
   the velocity pickup, the solenoidal coil and the magnetic field sensor are integrally configured.

7. The vibration meter according to claim 3, wherein the light source guides light of a plurality of wavelengths to the optical fiber, and, at the vibration probe, light outgoing from the optical fiber is dispersed into each of the wavelengths, and is modulated by the vibration detected by a same number of the velocity pickups as the wavelengths.

8. The vibration meter according to claim 2, wherein the velocity pickup comprises:
   a coil connected to the solenoidal coil; and
   a permanent magnet configured to provide a magnetic field to the coil,
   and wherein the coil is configured to relatively vibrate with respect to the permanent magnet.

9. The vibration meter according to claim 8, wherein, in the vibration probe, a vibration axis of the movable member, a direction axis of a magnetic field generated by the solenoidal coil and a magnetic field measurement axis of the magnetic field sensor are one of being identical and being parallel, and
   the velocity pickup, the solenoidal coil and the magnetic field sensor are integrally configured.

10. The vibration meter according to claim 2, wherein, in the vibration probe, a vibration axis of the movable member, a direction axis of a magnetic field generated by the solenoidal coil and a magnetic field measurement axis of the magnetic field sensor are one of being identical and being parallel, and
    the velocity pickup, the solenoidal coil and the magnetic field sensor are integrally configured.

11. The vibration meter according to claim 2, wherein the light source guides light of a plurality of wavelengths to the optical fiber, and, at the vibration probe, light outgoing from the optical fiber is dispersed into each of the wavelengths, and is modulated by the vibration detected by a same number of the velocity pickups as the wavelengths.

12. The vibration meter according to claim 1, wherein the velocity pickup comprises:
   a coil connected to the solenoidal coil; and
   a permanent magnet configured to provide a magnetic field to the coil,
   and wherein the coil is configured to relatively vibrate with respect to the permanent magnet.

13. The vibration meter according to claim 12, wherein the velocity pickup is covered with a shield case configured to shield an effect of a magnetic field external to the velocity pickup.

14. The vibration meter according to claim 13, wherein, in the vibration probe, a vibration axis of the movable member, a direction axis of a magnetic field generated by the solenoidal coil and a magnetic field measurement axis of the magnetic field sensor are one of being identical and being parallel, and
   the velocity pickup, the solenoidal coil and the magnetic field sensor are integrally configured.

15. The vibration meter according to claim 12, wherein, in the vibration probe, a vibration axis of the movable member, a direction axis of a magnetic field generated by the solenoidal coil and a magnetic field measurement axis of the magnetic field sensor are one of being identical and being parallel, and
   the velocity pickup, the solenoidal coil and the magnetic field sensor are integrally configured.

16. The vibration meter according to claim 12, wherein the light source guides light of a plurality of wavelengths to the optical fiber, and, at the vibration probe, light outgoing from the optical fiber is dispersed into each of the wavelengths, and is modulated by the vibration detected by a same number of the velocity pickups as the wavelengths.

17. The vibration meter according to claim 1, wherein, in the vibration probe, a vibration axis of the movable member, a direction axis of a magnetic field generated by the solenoidal coil and a magnetic field measurement axis of the magnetic field sensor are one of being identical and being parallel, and
   the velocity pickup, the solenoidal coil and the magnetic field sensor are integrally configured.

18. The vibration meter according to claim 1, wherein the light source guides light of a plurality of wavelengths to the optical fiber, and, at the vibration probe, light outgoing from the optical fiber is dispersed into each of the wavelengths, and is modulated by the vibration detected by a same number of the velocity pickups as the wavelengths.

19. The vibration meter according to claim 1, wherein the processor comprises a squarer squaring the electrical signal.

20. The vibration meter according to claim 1, wherein the processor comprises a differentiator, and is configured to output as the output voltage value an acceleration representing a state of the vibration.

* * * * *